(12) United States Patent
Dennis

(10) Patent No.: US 7,343,944 B2
(45) Date of Patent: Mar. 18, 2008

(54) HIGH FLOW FUEL INLET PIPE

(75) Inventor: Scott Dennis, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 176 days.

(21) Appl. No.: 11/371,526

(22) Filed: Mar. 9, 2006

(65) Prior Publication Data

US 2007/0209733 A1    Sep. 13, 2007

(51) Int. Cl.
*B65B 1/04* (2006.01)

(52) U.S. Cl. .................. 141/302; 141/198; 141/202; 141/368

(58) Field of Classification Search .............. 141/1, 141/192, 198, 202, 286, 301, 302, 368; 220/86.2; 137/198, 613
See application file for complete search history.

(56) References Cited

U.S. PATENT DOCUMENTS

| 4,941,587 | A |   | 7/1990  | Terada          |         |
|-----------|---|---|---------|-----------------|---------|
| 5,056,570 | A |   | 10/1991 | Harris et al.   |         |
| 5,348,177 | A | * | 9/1994  | Sung            | 220/86.2 |
| 5,568,828 | A | * | 10/1996 | Harris          | 141/348 |
| 5,590,697 | A | * | 1/1997  | Benjey et al.   | 141/59  |
| 5,730,194 | A |   | 3/1998  | Foltz           |         |
| 5,931,327 | A |   | 8/1999  | Sung            |         |
| 5,960,839 | A |   | 10/1999 | Armesto et al.  |         |
| 6,257,287 | B1|   | 7/2001  | Kippe et al.    |         |
| 6,637,477 | B1|   | 10/2003 | Maier           |         |
| 6,675,841 | B2|   | 1/2004  | Burns           |         |
| 6,848,463 | B2| * | 2/2005  | Johansen        | 137/202 |

* cited by examiner

*Primary Examiner*—Timothy L. Maust
(74) *Attorney, Agent, or Firm*—Jason H. Foster; Kremblas, Foster, Phillips & Pollick

(57) ABSTRACT

An improved elongated fuel inlet pipe having an opening on one end for inserting a fuel source and a plunger valve at an opposite end for permitting fluid to flow into a tank. The pipe has a plurality of slots in a top sidewall of the pipe, a movable closure over the slots and a spring to bias the collar to a closed position. A gate is mounted inside the pipe and is drivingly linked to the closure by a finger that extends through one of the slots for displacing the closure longitudinally toward the plunger valve when there is an increased pressure applied to the gate for permitting fluid flow through the slot.

10 Claims, 3 Drawing Sheets

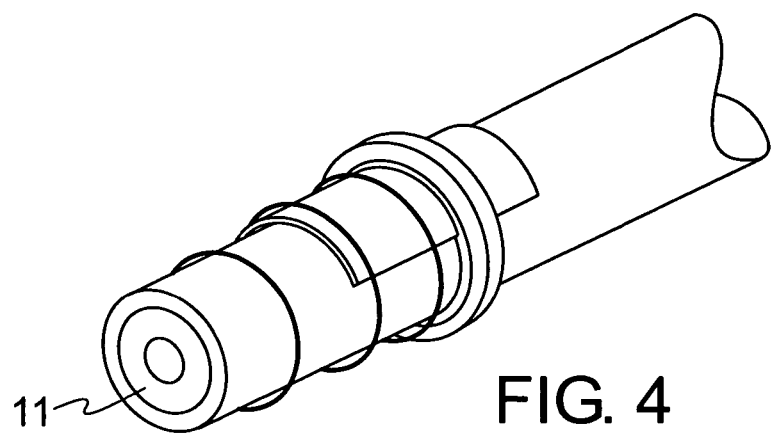
FIG. 4
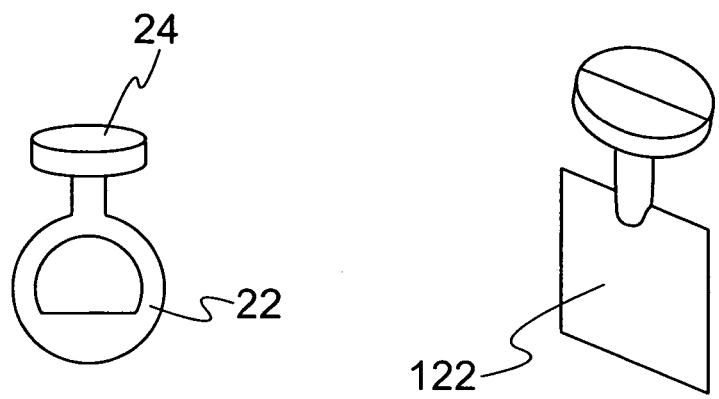
FIG. 5
FIG. 6
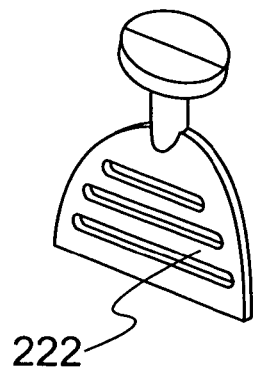
FIG. 7
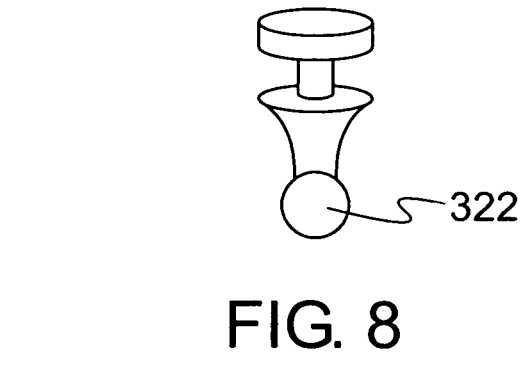
FIG. 8

US 7,343,944 B2

HIGH FLOW FUEL INLET PIPE

BACKGROUND OF THE INVENTION

1. Field of the Invention

This invention relates generally to fuel inlet pipes and, more specifically, to a cylindrical pipe used in a vehicle fuel tank inlet and having a first and a second valve.

2. Description of the Related Art

A conventional fuel inlet pipe is mounted at the inlet to a fuel tank. The pipe has an opening on one end, into which a fuel enters from the fuel filler pipe during refueling. A one-way plunger valve is located at the opposite end permitting fuel to flow into a fuel tank and preventing fuel from coming out. When a fuel tank is being filled through the pipe, the hydrostatic force of the rising fuel level works to close the plunger valve, causing fuel to back up the fuel filler pipe and the nozzle to shut off. This prevents a user from filling the tank to capacity, and only allows them to fill the tank to the level where hydrostatic forces inside the tank allow. Normally, this is not a problem for the average automobile consumer, because each manufacturer must position the inlet pipe to be unaffected by hydrostatic forces and to make closing of the valve coincide with a designed automatic stop. However, in industries where fuel capacity is an issue, such as racing and hauling, the inability to fill a tank to capacity is a problem.

Therefore, it is the object and feature of the invention to provide an improved cylindrical fuel inlet pipe that, as the tank fills, keeps the inlet open so that the tank can accept the designed amount of fuel.

BRIEF SUMMARY OF THE INVENTION

The invention is an improved circular cylindrical pipe having an opening on one end for inserting a fuel source and a plunger valve at an opposite end for permitting fluid to flow into a tank. The pipe has a plurality of slots in a sidewall of the pipe with a movable closure over the slots and a spring biasing the closure to a closed position. A gate is mounted inside the cylindrical pipe and is drivingly linked to the closure by a finger that extends through one of the slots for displacing the closure longitudinally toward the plunger valve when there is an increased pressure applied to the gate for permitting fluid flow through the slot.

BRIEF DESCRIPTION OF THE SEVERAL VIEWS OF THE DRAWINGS

FIG. 4 is a schematic view illustrating a portion of the embodiment of FIG. 1.

FIG. 5 is a schematic view illustrating a gate.

FIG. 6 is a schematic view illustrating an alternative gate embodiment.

FIG. 7 is a schematic view illustrating an alternative gate embodiment.

FIG. 8 is a schematic view illustrating an alternative gate embodiment.

Figure 1:
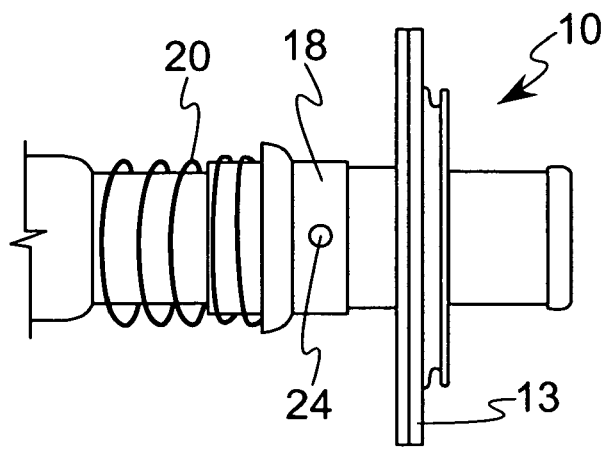
FIG. 1 is a top view illustrating an embodiment of the present invention.

In describing the preferred embodiment of the invention, which is illustrated in the drawings, specific terminology will be resorted to for the sake of clarity. However, it is not intended that the invention is limited to the specific term so selected and it is to be understood that each specific term includes all technical equivalents, which operate in a similar manner to accomplish a similar purpose.

DETAILED DESCRIPTION OF THE INVENTION

Figure 2:
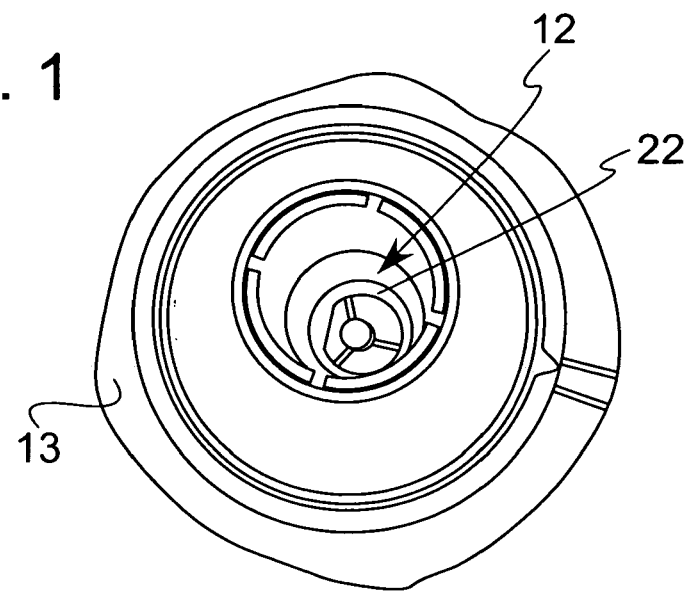
FIG. 2 is an end view illustrating the embodiment of FIG. 1.
Figure 3:
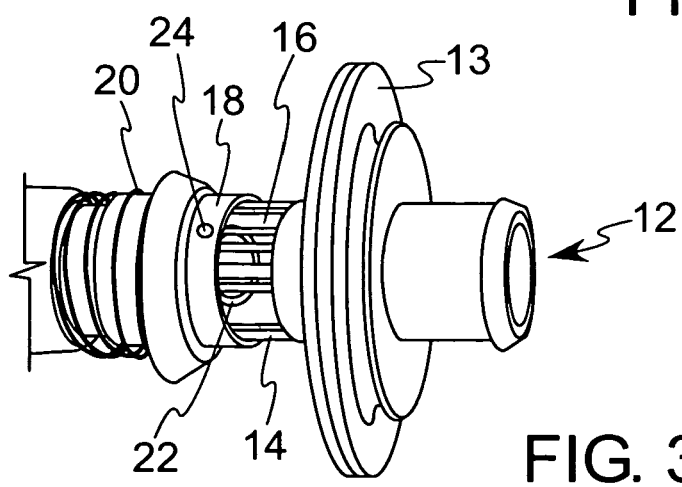
FIG. 3 is a top view in perspective illustrating the embodiment of FIG. 1.

The preferred embodiment of the present invention is illustrated in FIGS. 1-3. The circular cylindrical pipe 10 has an opening 12 at one end for accepting fuel from a source, such as a fuel tube (not shown) and a plunger valve 11, shown in FIG. 4, at an opposite end for permitting fluid to flow into a tank (not shown). The opening 12 is a standard fuel inlet pipe opening, but can be larger or smaller to accommodate a variety of fuel sources, such as fuel tubes. The pipe is preferably made from plastic, but can be made from a variety of suitable materials, including metals. Furthermore, the cross-sectional shape of the pipe 10 is circular but can be any geometric shape for example, square, oval or triangular.

A sidewall 14 of the pipe 10 preferably has a plurality of slots 16 through which fluid in the pipe 10 can flow into the tank. The pipe 10 has a flange 15 that preferably attaches to the outside of the fuel tank sidewall 13, (shown cut out in FIGS. 1-3), thereby positioning the slots 16 on the inside of the tank. A person having ordinary skill in the art will recognize that there can be a larger single slot that functions in a similar manner as a plurality of smaller slots. The slots 16 are preferably on a top sidewall of the pipe and have a rectangular shape, but can be on any side and can be one of a variety of shapes. The position on top of the pipe permits filling of the fuel tank as much as possible.

As illustrated in FIGS. 1 and 3, an axially movable collar 18 is mounted over the slots 16. A spring 20 seats at one spring end against the collar 18 and at the other spring end against the pipe 10. The collar 18 is made of a plastic, but can be made from a variety of suitable materials, such as rubber, aluminum or steel. The collar 18 can also have a gasket that is made of a different material that enhances sealing of the slots 16. The spring 20 is made of metal, but can be made of any material, and have any configuration that exerts a bias tending to close the collar 18. The collar 18 acts as a closure that seals the slots 16 to prevent flow of fluids inside the pipe 10 through the slots 16 to the exterior of the pipe 10, or in the opposite direction. Thus, when the collar 18 is in the position shown in FIG. 1, the slots 16 are closed, and in FIG. 3, the slots 16 are open.

A gate 22 is mounted inside the cylindrical pipe 10 and is drivingly linked to the collar 18 by a finger 24 that extends through one of the slots 16 or a dedicated slot (not shown). The finger 24 can be linked to the collar by an adhesive, or the linkage can be a pressure fit or another mechanical connection, including forming the finger 24 integral with the gate 22.

The collar 18 covers the slots 16 when it is in the closed position shown in FIG. 1, and prevents fluid from flowing through the slots 16. As the fuel coming into the opening 12 increases the pressure within the pipe 10, the gate 22 is pushed in a direction toward the plunger valve 11, which moves the linked collar 18 in the same direction. In order to move the collar 18, the spring 20 must compress toward the plunger valve 11. This collar 18 movement thereby uncovers the slots 16. When uncovered, the slots 16 allow fuel to flow between the fuel tank and the interior of the pipe 10. Thus, the fuel flows into the tank under these conditions. When the pressure in the pipe and against the gate 22 decreases sufficiently, the spring 20 overcomes the pressure on the gate 22 and forces the collar 18 back to the closed position over the slots 16, thereby slowing and then ceasing the flow of fuel into the tank from the pipe 10 (or vice versa).

The gate 22 is preferably a circular ring, shown in FIG. 5, to allow fluid to flow around and through it. Alternatively, as shown in FIG. 6, the gate 122 can be square and have no central opening. In another alternative shown in FIG. 7, the gate 222 can be crescent shaped with slotted openings. In yet a further alternative shown in FIG. 8, the gate 322 can have a cone shape. These alternatives are only a few illustrative examples and, as will be recognized by a person having ordinary skill in the art, the shape of the gate 22 can be any geometric shape suitable for the inside of the pipe.

Figure 9:
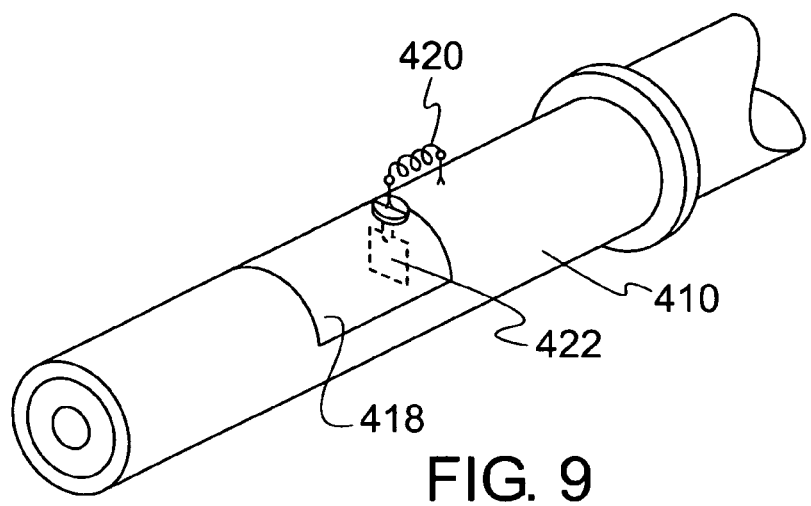
FIG. 9 is a schematic view illustrating an alternative embodiment of the invention.
Figure 10:
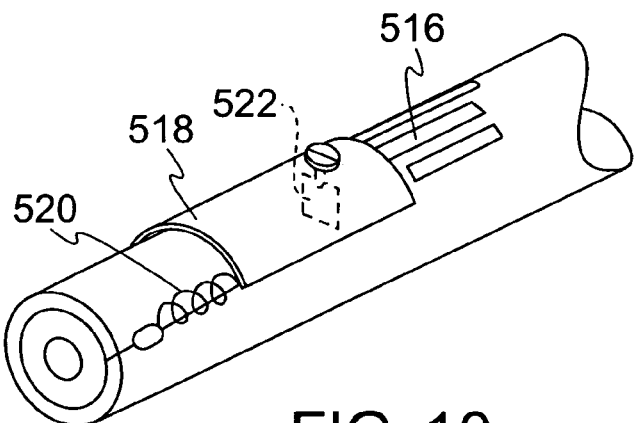
FIG. 10 is a schematic view illustrating an alternative embodiment of the invention.
Figure 11:
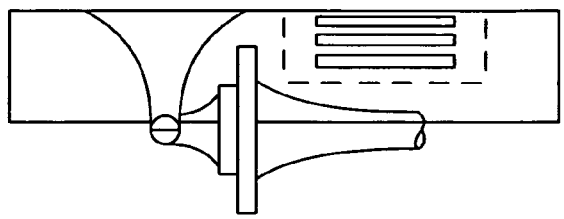
FIG. 11 is a schematic side view illustrating an alternative embodiment of the invention.
Figure 12:
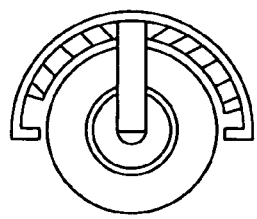
FIG. 12 is a schematic front view illustrating the embodiment of FIG. 11.

A further alternative embodiment is illustrated in FIG. 9 having a spring 420 mounted to an outside top sidewall of the pipe 410 and connected to a gate 422 for biasing the attached collar 418 to a closed position (shown in FIG. 9). Thus, in order to displace the gate 422, the spring 420 must be elongated rather than compressed as in the preferred embodiment. In an alternative embodiment shown in FIG. 10, the gate 522 is mounted to the collar 518 at one end and to the spring 520 at an opposite end within the pipe for closing the collar 518 as the fuel pressure decreases as described above.

In operation, the invention operates in the following manner, using the embodiment of FIGS. 1-3 as an example. A user inserts a spigot or other fuel source into the opening 12 of the pipe 10 and injects fluid, such as gasoline, into the pipe. As fluid pressure increases inside the pipe, the plunger valve 11 opens and the gate 22 moves longitudinally toward the plunger valve 11. Movement of the gate 22 moves the collar 18, thereby uncovering the slots 16. The fluid enters the tank through the open plunger valve 11 and through the uncovered slots 16. As the tank fills, hydrostatic forces act to close the standard plunger valve 11. The fuel pressure exerted on the gate 22 is still sufficient, however, to keep the collar 18 open, which thereby permits fluid to continue to enter into the remaining void in the tank through the slots 16. The collar 18 closes only when the fuel pressure from the fuel filler pipe on the gate 22 is not sufficient to overcome the bias of the spring 20, whereby the spring 20 moves the collar 18 back to its resting position, covering the slots 16.

The major surface area of the plunger valve is perpendicular to the axis along which it moves. Therefore, the hydrostatic force or vapor pressure from inside the tank can force the plunger valve 11 to close even if there is still a void in the tank. However, the pressure inside the tank has no tendency to close the collar 18 because the collar's major surface is substantially parallel to its direction of movement. Thus, the only substantial forces applied to the collar that tends to open or close the collar are those applied by the gate and the spring. Because the gate 22 is displaced by the pressure in the fuel filler pipe, not the tank, the pressure in the tank does not tend to close the collar 18. In order for the collar 18 to close, the pressure from the fuel filler pipe must be decreased or terminated, allowing the spring to return the collar to a closed position. Using the invention, more fuel can enter the tank through the slots, after the plunger valve is closed, filling more of the tank with fluid.

While certain preferred embodiments of the present invention have been disclosed in detail, it is to be understood that various modifications may be adopted without departing from the spirit of the invention or scope of the following claims.

The invention claimed is:

1. An improved elongated fuel inlet pipe having an opening at one end for accepting a fuel source and a plunger valve at an opposite end for permitting fluid to flow into a tank, the improvement comprising:
    (a) at least one slot in a sidewall of the pipe and a longitudinally-movable closure mounted at least partially over said slot; and
    (b) a gate mounted inside the cylindrical pipe and drivingly linked to the closure by a finger that extends through said at least one slot, said gate being for displacing the closure longitudinally toward said plunger valve under the influence of pressure applied to said gate, thereby uncovering and permitting fluid flow through said at least one slot.

2. The improvement in accordance with claim 1, wherein said at least one slot further comprises a plurality of slots in the sidewall of the pipe.

3. The improvement in accordance with claim 2, wherein said plurality of slots are positioned in a top sidewall of the pipe.

4. The improvement in accordance with claim 1, further comprising a spring mounted to said closure and said pipe for biasing the closure toward a position covering said at least one slot.

5. The improvement in accordance with claim 4, wherein said closure is a collar.

6. The improvement in accordance with claim 1, wherein said pipe is circular cylindrical.

7. The improvement in accordance with claim 1, wherein said slot is rectangular.

8. The improvement in accordance with claim 1, wherein said gate is circular.

9. An improved elongated fuel inlet pipe having an opening at one end for accepting a fuel source and a plunger valve at an opposite end for permitting fluid to flow into a tank, the improvement comprising:
    (a) a plurality of slots in a top sidewall of the pipe and a longitudinally movable collar mounted over said slots;
    (b) a spring mounted to the collar and the pipe for biasing the collar to a closed position; and
    (c) a gate mounted inside the circular cylindrical pipe and drivingly linked to the collar by a finger that extends through one of said slots for displacing the collar longitudinally toward said plunger valve under the influence of pressure applied to said gate and permitting fluid flow through said slots.

10. A method for filling a fuel tank using an improved elongated fuel inlet pipe having an opening at one end for accepting a fuel source and a plunger valve at an opposite end for permitting fluid to flow into a tank, the method comprising:
    (a) inserting a fuel source into the opening;
    (b) injecting fluid from the fuel source into the pipe which has a plurality of slots in a top pipe sidewall and a longitudinally movable closure mounted over said slots;

(c) applying fluid pressure against a gate that is mounted inside the pipe and drivingly linked to the closure by a finger that extends through one of said slots, thereby displacing the closure longitudinally toward said plunger valve and permitting fluid flow through the slots; and (d) reducing said fluid pressure as the tank fills, thereby releasing said closure to be biased to a resting position by a spring mounted to the closure and the pipe.

\* \* \* \* \*